Sept. 2, 1969 R. J. KOERNER 3,465,304

SELECTION DEVICE FOR CONTENT ADDRESSABLE MEMORY SYSTEM

Filed June 20, 1966 2 Sheets-Sheet 1

INVENTOR.
RALPH J. KOERNER
BY Arthur Freilich
ATTORNEY

Sept. 2, 1969 R. J. KOERNER 3,465,304

SELECTION DEVICE FOR CONTENT ADDRESSABLE MEMORY SYSTEM

Filed June 20, 1966 2 Sheets-Sheet 2

INVENTOR
RALPH J. KOERNER
BY Arthur Freilich
ATTORNEY 3,465,304
Patented Sept. 2, 1969

1

3,465,304

SELECTION DEVICE FOR CONTENT ADDRESSABLE MEMORY SYSTEM

Ralph J. Koerner, Canoga Park, Calif., assignor to The Bunker-Ramo Corporation, Stamford, Conn., a corporation of Delaware Filed June 20, 1966, Ser. No. 558,704
Int. Cl. G11c 7/00
U.S. Cl. 340—173 9 Claims

ABSTRACT OF THE DISCLOSURE

A selection device suitable for use in a content addressable memory system for seeking, out of a plurality of binary elements, one element in a given state. The selection device includes a memory which stores a different multibit identification code for each of the binary elements. By searching those locations of the memory associated with elements defining the sought state for the minimum (or, alternatively, a maximum) identification code, one of the elements will be isolated.

The invention herein described was made in the course of or under a contract or subcontract thereunder, with Bureau of Ships.

This invention relates generally to data processing apparatus and more particularly to a selection device for use with a plurality of binary elements for seeking out and selecting one of the elements in a given state.

In many diverse digital data processing systems, a bank of binary elements is provided, with each element being connected to a different conductor so as to sense a binary signal thereon, which can be manifested by the presence or absence of a pulse having predetermined characteristics and can be representative of the occurrence or non-occurrence of a different condition. The binary element can be made to switch to a second state, for example, in response to the occurrence of a pulse. It is often desired to be able to examine the respective states of the various elements at the end of a certain time interval in order to determine which elements were switched to the second state or, alternatively, which elements remained in the first state. Although straightforward commutation techniques can be used to sequentially sample each element, this procedure is often unnecessarily slow, particularly where the number of elements having the sought state is small compared to the total number of elements in the bank.

This latter situation often arises, for example, in the use of a digital memory of the type disclosed in U.S. Patent No. 3,031,650 which can appropriately be considered a content addressable memory inasmuch as its storage locations are addressed or selected on the basis of the contents stored therein rather than on the basis of some arbitrarily assigned address. Such a memory permits all of the memory storage locations to be simultaneously searched to determine whether any of the words stored therein are identical to a search word being sought. A common word line is associated with all of the storage elements of each storage location, and for each bit of the stored word which does not match the corresponding bit of the search word, a pulse is provided on the word line. (Of course, in an alternative embodiment, pulses can be provided to represent a match.) Each word line usually has a binary element connected thereto which is switched to a second state in response to the presence of one or more pulses on the word line. At the end of a search period, it is desirable to examine all of the binary elements to determine which ones, if any, remained in the first state. A binary element remaining in the first state

2 would, of course, indicate that all of the bits stored in the associated storage location are respectively identical (i.e., match) to the corresponding bits of the search word. In addition to merely determining which binary elements remain in the first state, it is sometimes desirable to make these determinations sequentially in order to subsequently read out, write in, or modify information associated therewith.

Inasmuch as the number of binary elements remaining in the first state for most contemplated applications of a content addressable memory will be extremely small compared to the total number of binary elements in the bank, it is desirable to avoid the utilization of conventional time consuming commutation techniques to sequentially sample each of the elements.

In view of this, it is an object of the present invention to provide a selection device suitable for use with a plurality of binary elements for seeking out and selecting one of the elements in a given state. More particularly, if it is assumed that the binary elements are respectively arbitrarily numbered 1, 2, 3, . . . N, it is an object of the present invention to provide means for selecting the lowest (or highest) numbered element in a given state.

More particularly, it is an object of the present invention to provide a selection device which can select the lowest numbered element in a given state in the same finite time period regardless of which particular element is in fact the lowest numbered element in said given state.

Briefly, the present invention is based on the recognition that a particular one of a plurality of binary elements defining a given state can be selected by employing a memory which stores a different identification code for each of the binary elements. By searching those locations of the memory associated with elements defining the sought state for the minimum (or, alternatively, the maximum) identification code, one of the elements will be isolated.

Once an initial identification code is isolated, an appropriate action can be initiated which, after completion, can switch the element corresponding thereto out of the sought state. The memory can then be searched again to determine the minimum code associated with an element still defining the sought state. In this manner, the codes representing all of those elements defining the sought state can be successively ascertained.

Although the selection device disclosed herein finds particular utility in conjunction with content addressable memories, it additionally can be advantageously employed wherever a plurality of conductors, on which signals having predetermined characteristics can randomly appear, are to be monitored. For example only, the selection device herein can be used to monitor a plurality of telephone lines which are randomly and possibly simultaneously energized. It should also be understood that, although reference is sometimes made herein to the "lowest numbered" or "highest numbered" element, it should be appreciated that the numbers are arbitrarily applied to the elements, and in fact embodiments of the invention can be operated to determine elements defining the sought state in any sequence desired.

The novel features that are considered characteristic of this invention are set forth with particularity in the appended claims. The invention will best be understood from the following description when read in connection with the accompanying drawings, in which:

Figure 1:
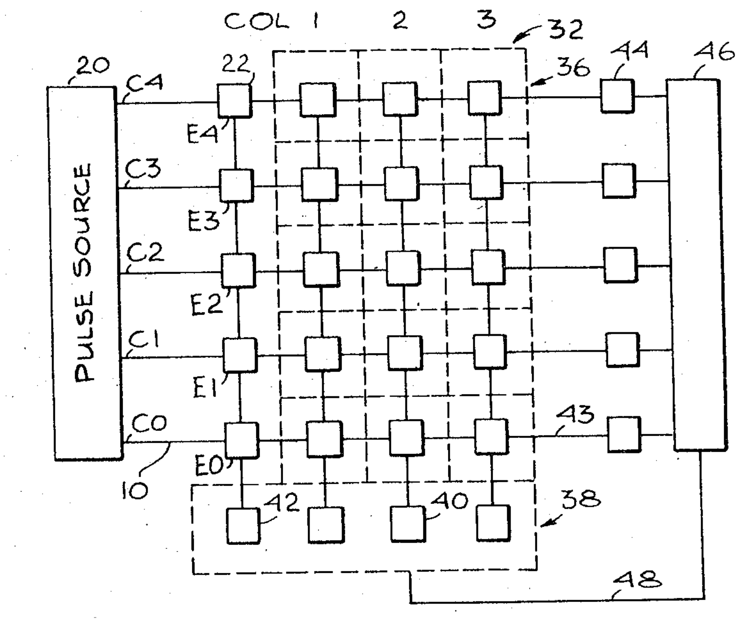
FIG. 1 is a block diagram illustrating a system employing the concept of the present invention.

Attention is now called to FIG. 1 of the drawings, which illustrates a block diagram of a system employing the concept of the present invention. More particularly, a system in accordance with the present invention is employed to monitor a plurality of conductors 10, respectively identified as C0, C1, C2, C3, C4, which are illustrated as comprising output lines of a pluse source 20. Each conductor 10 is connected to a different one of the binary elements 22, respectively identified as E0, E1, E2, E3, E4. It is contemplated that the appearance of a pulse on any one of the conductors 10 will switch the binary element 22 connected thereto from a first to a second state. The character of the pulse source 20 is not significant to the present invention in that the present invention is directed to means for examining the states of the binary elements 22 to sequentially select elements defining a given state. However, a system in accordance with the invention is particularly useful for the purpose of monitoring match store binary elements connected to the output of content addressable memory word sense lines; that is, the pulse source 20 shown in FIG. 1 can comprise a content addressable memory, for example, with the output conductors 10 constituting the word sense lines thereof. In such an application, the pulses appearing on the output conductors could comprise mismatch signals which switch the binary elements 22 to a mismatch state. After a search has been conducted through the content addressable memory (pulse source 20), it is usually desired to examine the states of the elements in order to determine which define a first or match state, for example, and which define a second or mismatch state. Moreover, it is desirable to be able to select in sequence those binary elements 22 remaining in a first state.

Various types of commutator apparatus are available in the prior art for sequentially examining the states of the binary elements. However, where a great number of binary elements must be examined and where only a small portion of these are likely to be in the sought state, it, of course, takes an excessively long time to examine the elements using straightforward commutation techniques. Accordingly, some form of jump commutation is usually employed. One such type of jump commutation apparatus is disclosed in U.S. patent application Ser. No. 296,053, now Patent No. 3,300,766, filed by Ralph J. Koerner et al. on July 18, 1963, entitled "Selection Device," and assigned to the same assignee as the present application. The present invention is directed to an alternative arrangement for rapidly examining the states of the binary elements and sequentially selecting those in a a given state.

More particularly, in accordance with the basic concept of the present invention, a memory 32 is provided comprised of memory devices 34 arranged in N rows and M columns. Each row 36 defines a memory location and is associated with a different one of the binary elements. A different identification code is stored in each of the memory locations 36, and since M bits can be stored in each location, N is usually chosen to be equal to $2^M$. For illustration, however, memory 32 is illustrated as including five rows and three columns.

Associated with the memory 32 is a search register 38 which includes one stage 40 for each memory column and an additional stage 42 for the column of binary elements 22. All of the memory devices 34 of the same row are coupled to a common word line 43 which is connected to the input of a binary device 44. The devices 44 are all coupled to a sensing apparatus 46.

Briefly, in operating the apparatus of FIG. 1 to select one of the elements 22 in a given state, the memory 32 is searched to determine the location associated with an element 22 in that state which stores the minimum identification code. Although various arrangements are probably available in the prior art enabling all of the locations in the member 32 to be simultaneously searched to locate a minimum (or maximum) code stored therein, a particularly useful apparatus for performing such a function is disclosed in U.S. patent application Ser No. 479,947, filed by Ralph J. Koerner on Aug. 16, 1965, entitled "Content Addressable Memories," and assigned to the same assignee as the present application.

In order to explain the operation of the system depicted in FIG. 1, let it be assumed that it is desired to select that binary element 22 defining a "1" state having the highest valued identification code associated therewith. In this event, a binary "1" digit is initially loaded into all of the stages of the search register 38, and the binary devices 44 are all set to a match state. Then the state of search register stage 42 is simultaneously compared with the state of all of the elements 22, and the states of the other search register stages 40 are sequentially compared with the states of all of the memory devices 34 in the corresponding column. Wherever a comparison results in a mismatch, a mismatch signal will be provided on the appropriate word line 43 to thus switch the associated device 44 to a mismatch state. It should be appreciated that by comparing the search register stages with the memory elements in sequence, at some point in the comparison procedure only one of the devices 44 will remain in a match state. This, of course, will identify the highest numbered binary element which defines the sought state.

A convenient way of determining when only one of the devices 44 defines a match state is to utilize the sensing apparatus 46 which responds to the last of the devices 44 switching to a mismatch state for effectively backspacing by changing the state of the most recently compared search register stage 40 and switching the device 44 most recently switched to a mismatch state back to a match state. Thus, at the end of a search through the memory 32 of FIG. 1, only one of the devices 44 will remain in a match state, and this will indicate the binary element in the sought state associated with the highest valued identification code.

As noted, the block diagram of FIG. 1 is set forth herein only to illustrate the general concept of the present invention of providing a memory having a number of locations equal to the number of binary elements being monitored and storing in those locations a different identification code for each of the elements and then searching through the memory to locate the highest numbered identification code associated with a binary element in the sought state. It has been pointed out that one apparatus suitable for searching through a memory 32 as shown in FIG. 1 for locating a maximum (or a minimum) word stored therein is fully disclosed in the aforecited U.S. patent application Ser. No. 479,947.

The memory 32 of FIG. 1 can employ several different types of memory elements 34. For example only, the elements 34 can comprise some type of magnetic core device, thin film device, or other well known memory device. In addition, it is recognized that, inasmuch as the usage of the memory 32 for the purpose described does not require that the information stored therein be modified at any time, the indentification codes can also be physically wired into the memory 32, as by utilizing a diode memory, for example. More particularly, attention is now called to FIG. 2, which illustrates a preferred embodiment of the invention in which the identification codes for each of the binary elements are defined by the positions of diodes in a diode matrix.

Figure 2:
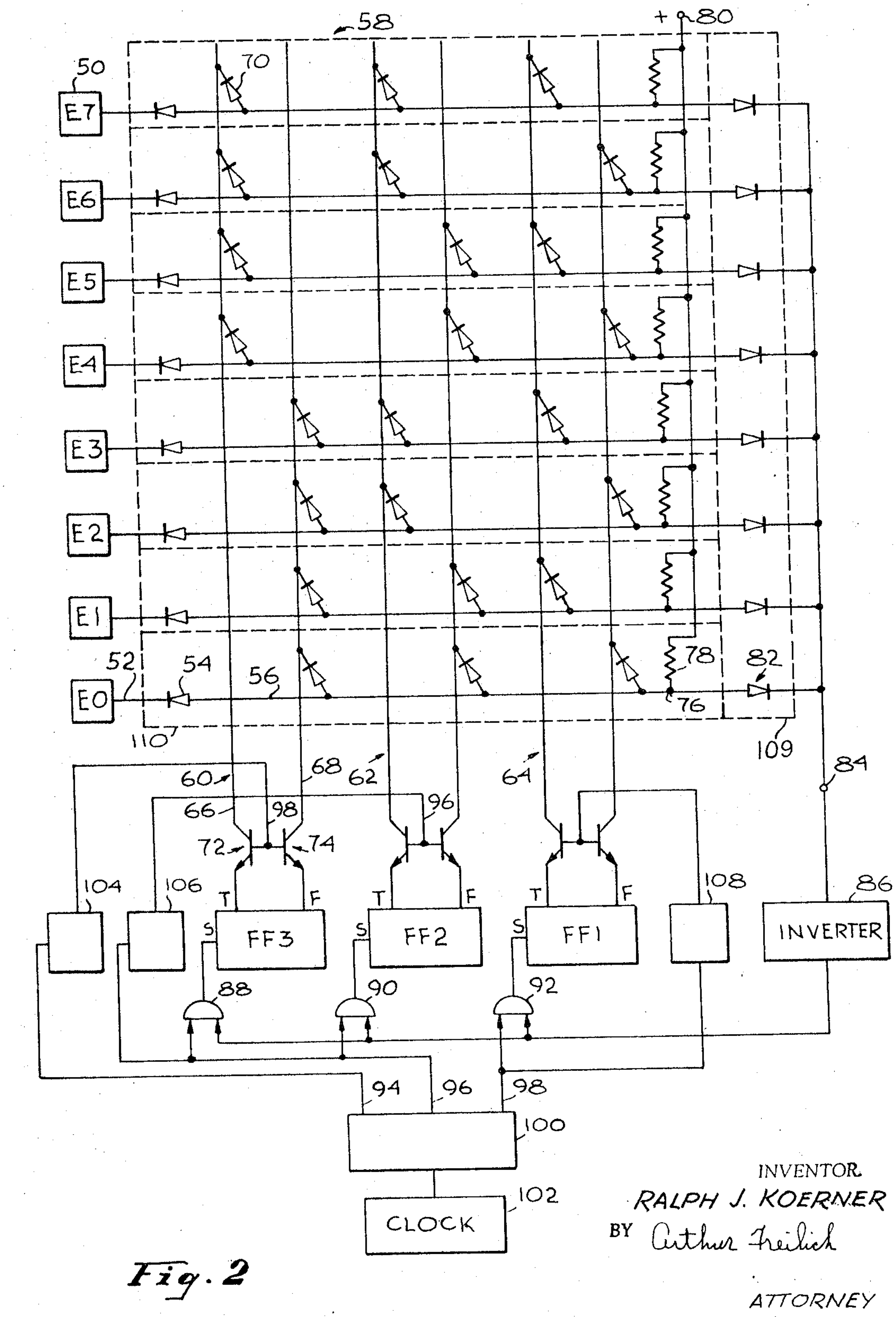
FIG. 2 is a schematic diagram illustrating a preferred embodiment of the present invention.

More particularly, consider that it is desired to monitor the eight binary elements 50 shown in FIG. 2, respectively identified as E0–E7. The output conductor 52 of each of the binary elements 50 is connected through a diode 54 to a different one of eight word lines 56. In addition to the eight word lines 56, the memory 58 includes three sets of column conductors 60, 62, and 64. Each set of column conductors includes a binary "1"

conductor 66 and a binary "0" conductor 68. The three sets of column conductors 60, 62, and 64 enable the diodes 70 to define three bit identification codes for each of the binary elements 50. More particularly, the word line 56 connected to binary element E7 is connected through diode 70 to the "1" conductor 66 of each of the sets of column conductors. Thus, the diodes connected to the word line 56 associated with element E7 define the code 111 which, it will be appreciated of course, represents the decimal digit 7. Similarly, the code 110 (equal to the decimal digit 6) is defined by the diodes connected to the word line 56 to which the element E6 is connected. Similarly, each of the other elements 50 is connected to diodes which define a binary code representative of its position.

Each of the column conductors is connected through a switch to a flip-flop output terminal. More particularly, conductors 66 and 68 of the set of column conductors 60 are connected through transistor switches 72 and 74 to the true and false output terminals respectively of a flip-flop FF3. Similarly, the column conductors 66 and 68 of the set of column conductors 62 are connected through transistor switches to the true and false output terminals of flip-flop FF2. Likewise, transistor switches connect the conductors 66 and 68 of the set of column conductors 64 to the true and false output terminals respectively of flip-flop FF1. The end of each word line 56 remote from the binary elements 50 is connected to a first terminal 76 of a resistor 78. The second terminals of resistors 78 are connected in common to a positive direct current potential terminal 80. Also connected to each terminal 76 is the anode of a diode 82 whose cathodes are connected in common to an output terminal 84. The output terminal 84 is connected through an inverter 86 to the input of three AND gates 88, 90, and 92. Output terminals 94, 96, and 98 respectively of a timing device 100 are also respectively connected to the input of AND gates 88, 90, and 92.

The timing device 100 cyclically defines time periods $t_1$, $t_2$, and $t_3$ in response to pulses provided by clock source 102. During each of these periods, true logical output signals are respectively applied to terminals 94, 96, and 98. In addition to being connected to AND gates 88, 90, and 92, the output terminals 94, 96, and 98 are respectively connected to the input terminals of latching circuits 104, 106, and 108, which can comprise conventional flip-flops. The output terminals of latching circuits 104, 106, and 108 are respectively connected to the bases of the transistor switches coupled to the conductor sets 60, 62, and 64. Thus, in response to a true output signal appearing on terminals 94, 96, and 98, the latching circuit coupled thereto will be latched to thus forward bias the transistor switches to which it is connected. the outputs of AND gates 88, 90, and 92 are respectively connected to the set input terminals of flip-flops FF3, FF2, and FF1 and thus, when enabled, switch the flip-flops to their "1" or true state.

Let it be assumed that the apparatus of FIG. 2 is to be utilized to select one of the binary elements 50 which defines a true state. Let is also be assumed that a true state is defined by the appearance of a high potential on the output conductor 52 of those elements defining a true state. Let is also be assumed that when the flip-flops FF1 to FF3 define a true state, a high potential will appear on the true output terminals thereof, and a ground potential will appear on the false output terminals thereof. Conversely, when the flip-flops FF1 to FF3 define a false state, a ground potential will appear on the true output terminals thereof, and a high potential will appear on the false output terminals thereof.

As an example, let it be assumed that at time $t_0$ (i.e., prior to time $t_1$) binary elements E1, E2, E4, and E6 are true and thus provide a high potential output. Inasmuch as none of the transistor switches will be conducting at this time, the first terminal 76 of the resistors 78 connected to these binary elements will also be at a high potential, thus providing a high potential or true signal to the inverter 86. The four other switches E0, E3, E5, and E7 will, of course, define a false state, thus establishing a ground potential on the output conductors 52 thereof. Accordingly, a ground potential will be established at the terminal 76 connected thereto.

Further assume that each of the flip-flops FF1, FF2, and FF3 initially defines a binary "0" state, thereby establishing a ground potential at the true output terminal thereof.

At time $t_1$, the transistor switches 72 and 74 connected to the set of column conductors 60 will be closed. As a consequence, a ground potential will be transferred through the diodes 70 to the word lines 56 connected to each of the elements E4, E5, E6, and E7. This will have no effect on the word lines connected to elements E5 and E7 inasmuch as they had previously been at ground potential. However, it will have the effect of reducing the high potential previously appearing on the word lines 56 connected to elements E4 and E6 to ground. However, a high potential will continue to appear on the word lines connected to elements E1 and E2, thus providing a high potential output at terminal 84. At time $t_2$, the transistor switches 72 and 74 connected to the set of column conductors 62 will be closed to thereby ground the word lines connected to element E2. Thus, this leaves only the word line connected to element E1 at a high potential, but as a consequence thereof the output terminal 84 will remain at a high potential.

Subsequently, during time $t_3$, the transistor switches 72 and 74 associated with the set of column conductors 64 will be closed, thereby grounding the word line connected to element E1. As a consequence, the potential at the output terminal 84 will drop to ground potential, thereby causing the inverter 86 to apply a true input signal to gates 88, 90, and 92. Inasmuch as time period $t_3$ is being defined by timing circuit 100, gate 92 will be enabled, thus providing a pulse to the set input terminal of flip-flop FF1 to switch it to its "1" state. Thus, the flip-flops FF3, FF2, and FF1 will now define the code 001 identifying element E1. Accordingly, it has been shown how the apparatus of FIG. 2 operates to select one (in this case the element having the lowest identification code associated therewith) of a plurality of elements in a given state. It should be appreciated that the circuit of FIG. 2 will similarly operate regardles of which of the elements 50 happen to initially define the sought state.

The present invention is directed primarily to means for selecting a particular element in a given state and is not intended to cover apparatus for utilizing the information (i.e., the address defined by the flip-flops), but it should be appreciated that such information can be employed to initiate various operations. For example, if the elements 50 do indeed comprise match store elements associated with a content addressable memory, the address defined by the flip-flops can be utilized to operate upon the content addressable memory location associated with the selected element 50. If it is desired to subsequently locate another binary element 50 defining a true state, the address defined by the flip-flops can be employed to switch the initially selected element (i.e., E1 in the foregoing example) to a false state, and then the previously described search can be repeated.

Figure 3:
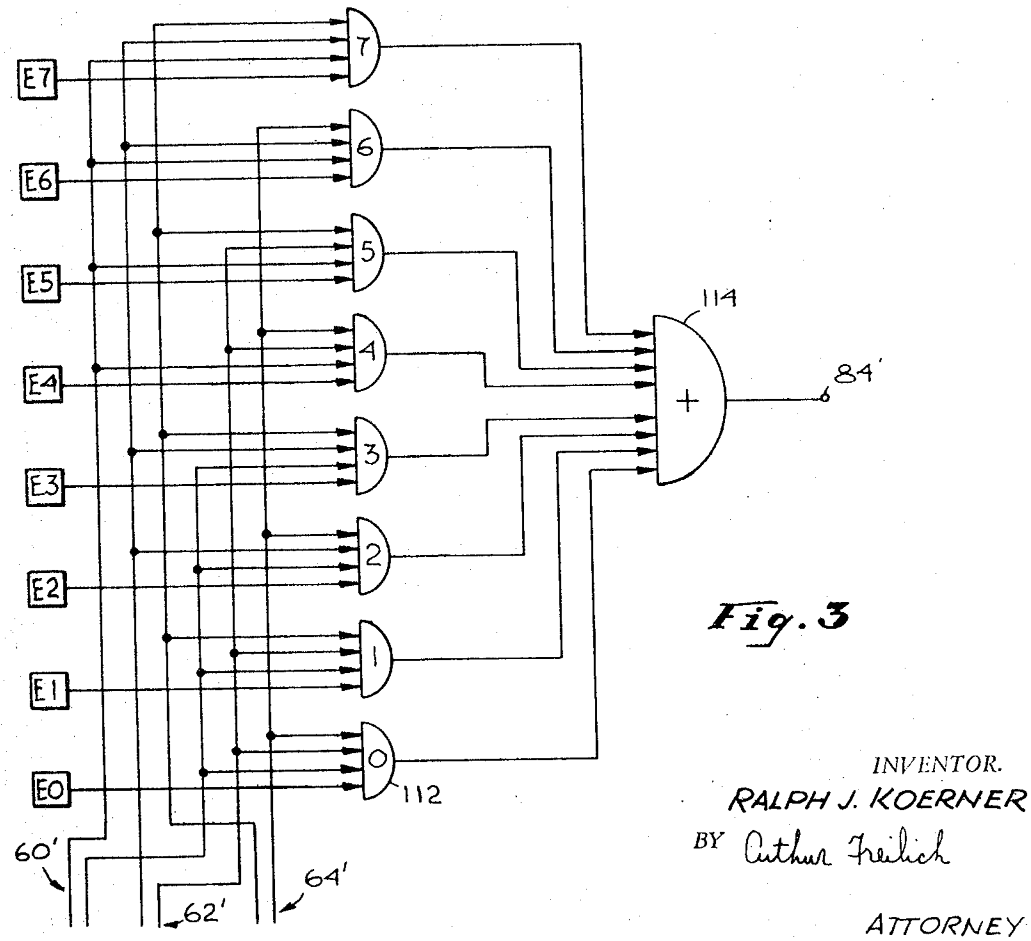
FIG. 3 is a logic block diagram illustrating a further representation of the embodiment of FIG. 2.

Although the invention has been thus far described in terms of utilizing locations of a memory (e.g., memory 32 in FIG. 1 and memory 58 in FIG. 2) for storing identification codes uniquely associated with each of the elements being monitored, it is pointed out that the embodiment of FIG. 2 can also be represented as illustrated in FIG. 3; that is, the diodes 70 in FIG. 2 defining the identification code for each element 50 together with the diode 54 connected to that element do in fact define an AND gate when connected to the resistor 78 as shown in FIG. 2. Thus, for example, the box 110 shown by the dotted lines in FIG. 2 can be represented by the AND gate 112 as illustrated in FIG. 3. Similarly, the diodes 70 connected to each of the other elements 50 can be represented by gates as shown in FIG. 3. The inputs to each of the AND gates shown in FIG. 3 are, of course, identical to those shown in FIG. 2; that is, the sets of column conductors 60', 62', and 64' shown in FIG. 3 respectively correspond to the sets of column conductors 60, 62, and 64 shown in FIG. 2.

It should also be appreciated that the box 109 in FIG. 2, shown in dotted lines, containing diodes 82 performs a logical OR function and can be represented by the gate 114 in FIG. 3.

From the foregoing, it should be appreciated that a selection device has been disclosed herein for monitoring a plurality of binary elements and selecting one such element defining a given state. More particularly, it should be appreciated that the invention is useful for rapidly performing a commutation operation.

The embodiments of the invention in which an exclusive property or privilege is claimed are defined as follows:

1. In combination with a plurality of binary elements each of which is able to independently assume either a first or second state, selection means for selecting one of said elements in said first state including:

a memory including a plurality of locations each associated with a different one of said elements and each storing a different identification code comprised of a plurality of fits; and means for determining the location associated with the element in said first state storing the lowest identification code.

2. The selection means of claim 1 wherein said identification codes are fixedly wired into said memory locations.

3. The selection means of claim 1 including:

means storing a test code including a plurality of bits; and means for successively comparing each bit of said test code simultaneously with the corresponding bits of all of said identification codes.

4. The selection means of claim 1 wherein said memory is comprised of N row conductors and M sets of column conductors, each set of column conductors including a "1" column conductor and an "0" column conductor; and wherein said identification codes are defined by means uniquely interconnecting each of said row conductors to said column conductors.

5. The selection means of claim 4 including selectively actuatable switch means connected to each of said column conductors.

6. In combination with a plurality of binary elements each of which is able to independently assume either a first or second state, selection means for selecting one of said elements in said first state including:

a plurality of gates;

means connecting each of said binary elements to a different one of said gates for initially enabling those gates connected to elements in said first state;

a register comprised of a plurality of stages each capable of defining first and second states;

means uniquely connecting said register stages to each of said gates;

means for successively activating said register stages to thus successively disable an increasing number of said gates; and means for monitoring said gates to determine which gate is disabled last.

7. The selection means of claim 6 wherein said means for monitoring includes means for indicating when all of said gates are disabled; and means responsive to all of said gates being disabled for modifying the state of the last register stage activated.

8. In combination with a plurality of binary elements each having an output line and capable of providing either a first or second signal level thereon, means for selecting one of said elements having a first signal level on its output line, said means including:

a different AND gate connected to each of said output lines;

a register comprised of a plurality of stages each capable of defining first and second states;

connecting means uniquely connecting said register stages to each of said AND gates, said connecting means including a selectively actuatable switch means associated with each of said stages; and means for sequentially actuating said switch means.

9. The selection means of claim 8 including means for monitoring said AND gates.

References Cited

UNITED STATES PATENTS

| | | | |
|---|---|---|---|
| 3,248,711 | 4/1966 | Lewin | 340—172.5 X |
| 3,264,624 | 8/1966 | Weinstein | 340—172.5 |
| 3,300,766 | 1/1967 | Koerner et al. | 340—174 |
| 3,354,436 | 11/1967 | Winder | 340—172.5 |

BERNARD KONICK, Primary Examiner

JOSEPH F. BREIMAYER, Assistant Examiner

U.S. Cl. X.R.

340—172.5